Jan. 12, 1932.  R. P. KOEHRING  1,840,724
PROCESS OF BONDING COOLING FINS TO CYLINDERS
Filed Nov. 25, 1929  2 Sheets-Sheet 1

Inventor
Roland P. Koehring
By Spencer Hardman & Fehr
His Attorneys

Jan. 12, 1932.   R. P. KOEHRING   1,840,724
PROCESS OF BONDING COOLING FINS TO CYLINDERS
Filed Nov. 25, 1929   2 Sheets-Sheet 2

Inventor
Roland P. Koehring
By Spencer Hardman & Fehr
His Attorneys

Patented Jan. 12, 1932

1,840,724

UNITED STATES PATENT OFFICE

ROLAND P. KOEHRING, OF DAYTON, OHIO, ASSIGNOR TO MORAINE PRODUCTS COMPANY, OF DAYTON, OHIO, A CORPORATION OF OHIO

PROCESS OF BONDING COOLING FINS TO CYLINDERS

Application filed November 25, 1929. Serial No. 409,740.

This invention relates to bonding copper fins to a ferrous metal cylinder.

An object is to produce in an efficient and economical manner an efficient thermal bond between said fins and ferrous cylinder.

Another object is to produce such a bond at a moderate temperature whereby the evil effects of higher temperatures, such as warping of the cylinder, oxidation of the fins and cylinder, or in the case of a heat-treated steel cylinder the harming of the heat treatment, are avoided.

Another object is to produce in a simple and efficient manner and at a moderate temperature an alloy bond between the fins and cylinder, which alloy bond will have a melting point much higher than the temperature at which it is formed, whereby it will not become weak or perceptibly change at the maximum temperatures experienced in use.

Further objects and advantages of the present invention will be apparent from the following description, reference being had to the accompanying drawings wherein a preferred embodiment of one form of the present invention is clearly shown.

The general method of pleating the fins from sheet Cu, then binding them upon the cylinder and brazing them thereto at a high temperature (approximately 1725° F.) is disclosed in Kettering Patent No. 1,668,508 issued May 1, 1928. This invention of the present application provides an important improvement over the processes described in said Kettering patent, particularly by providing a suitable alloy bond between the copper fins and ferrous metal cylinder at a very much lower temperature than is possible by any method disclosed by the Kettering patent.

A cylinder 30 of ferrous metal is preferably machined on the outside to provide a good bonding surface, and preferably the fine serrations or tool marks made by the cutting tool are left in the bonding surface of the cylinder to facilitate a better bonding as will be hereinafter described. This cylinder 30 has its bonding surface copper plated by any suitable method which of course includes suitable cleaning and fluxing of the surface to be plated.

Figure 2:
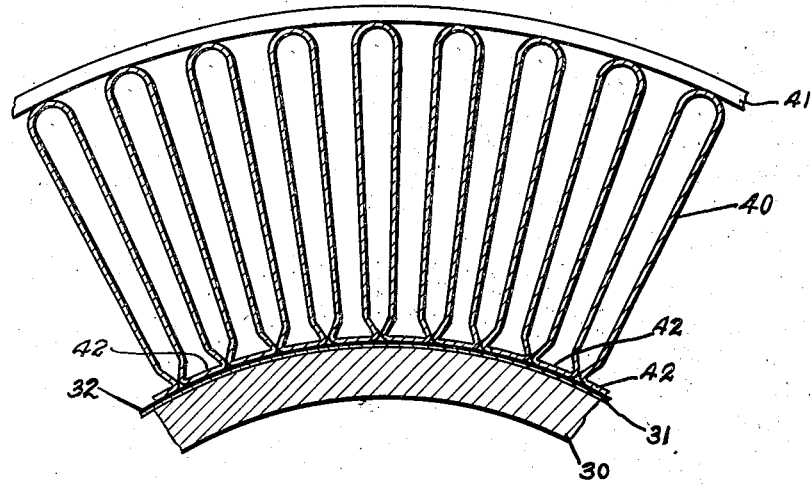
Fig. 2 is a fragmentary section on an enlarged scale taken on line 2—2 of Fig. 1.

This copper plating is indicated in exaggerated thickness by numeral 31 in Fig. 2. The cylinder 30 is next provided with a preferably very thin tin plating upon the outer surface of the copper plating but in Fig. 2 the thickness of the tin plating is shown only by the heavy line 32 since its thickness is relatively very small compared to that of the Cu plating. Preferably the Cu plating is approximately .002 inch thick while the tin plating is around .0002 inch thick, or as thin as it is possible to obtain and still get a complete tin coating on the copper. The tool marks in the ferrous cylinder remain as alternate fine high and low areas even after the copper plating 31 is applied and this results in an extremely thin film 32 of tin over the high areas if the tin coating 32 is applied by dipping in molten tin and immediately wiping off as much tin as possible and still leave a continuous film of tin over the copper 31.

Figure 4:
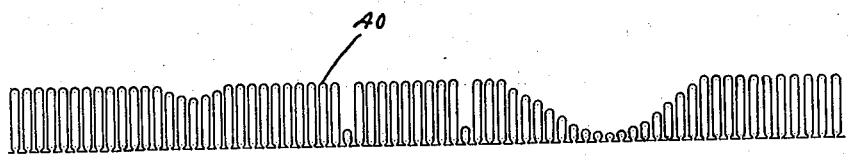
Fig. 4 shows one form of the pleated fins before it is wrapped around and clamped to the cylinder.
Figure 6:
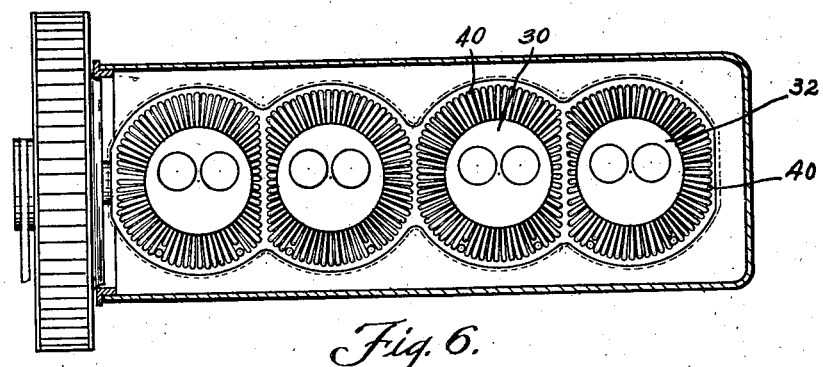
Fig. 6 is a plan view, partly in section, of an air-cooled engine having its cooling fins bonded to the cylinders by the method of this invention.
Figure 3:
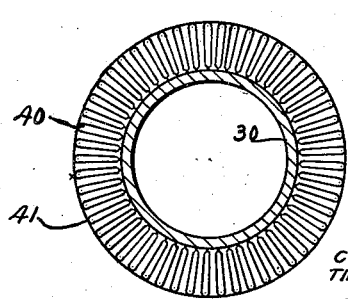
Fig. 3 is a cross section of the cylinder of Fig. 1.
Figure 5:
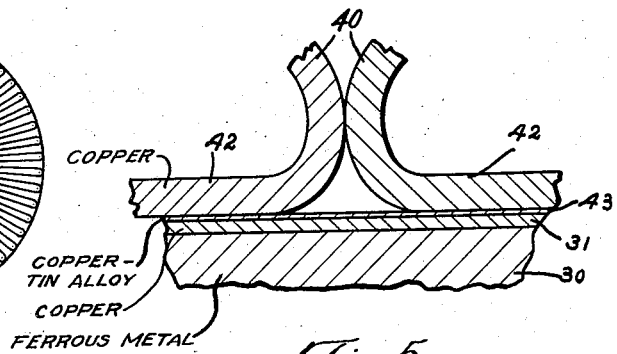
Fig. 5 is a highly magnified view showing in an exaggerated way the bond between the metal of the fins and the ferrous cylinder.

After the cylinder has been successively copper and tin plated the pleated fin structure 40, shown in Fig. 4, after being properly cleaned and fluxed by any suitable and well known method, is wrapped around the plated surface of cylinder 30 and clamped tightly into contact therewith by any suitable means such as by the wires 41. These wires 41 are preferably of basic iron or other metal having a smaller coefficient of heat expansion than that of the assembly of cylinder 30 and fins 40 in order to provide a higher pressure between the fins and cylinder during the subsequent heat treating operation. It is preferred that the contacting bases 42 of the fin loops be formed approximately as shown in Figs. 2 and 5, that is, so that they substantially completely cover the plated bonding surface of the cylinder 30. The exposed surfaces of the assembled fins and cylinder are then coated with a suitable oxidation preventing flux so that the copper will not undergo harmful change during the heat treating operation. This protective fluxing operation may be performed as described in the above Kettering patent or by any other suitable method.

This assembly is next heated in a gas or electric furnace to such a temperature and for such a time as will cause some of the Cu from the copper plating 31 and some of the Cu from the bonding surface of the fin bases 42 to alloy or diffuse into the thin tin layer 32 to such an extent that substantially all the tin layer 32 becomes converted into a copper-tin alloy 43 (see Fig. 5) and its melting point thereby materially raised, and in the mean time a strong efficient heat-conducting bond is obtained between the Cu plate 31 and the fin bases 42. The Cu plate 31 of course remains firmly bonded on its opposite surface to the cylinder 30 and hence there will result a very efficient heat-conducting path from the cylinder 30 to the fins 40. It has been found by microscopic examination that the tin coating is thinnest at the tops of the high areas, as hereinabove mentioned, and hence the Cu entering the tin layer from both sides thereof during the bonding heat treatment rapidly converts the tin layer into a bronze of high copper content having a melting point much higher than tin and which is strong and tough and provides a strong physical bond between the Cu layer 31 and the Cu fins 40.

Figure 1:
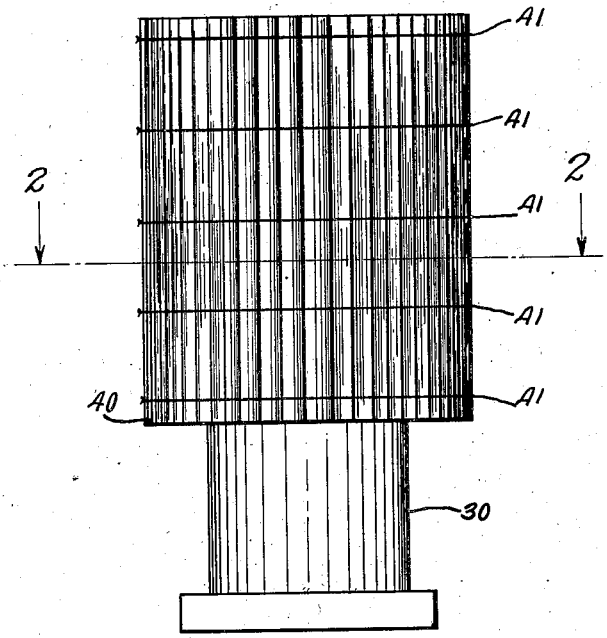
Fig. 1 is a side view of an engine cylinder showing the finning structure clamped upon the cylinder ready for the furnace.

The preferred method at the present time of the bonding heat treatment comprises placing the assemblies (shown in Fig. 1) in a closed chamber together with a bonding fluxing material which volatilizes at or slightly below the desired bonding temperature and heating the assemblies for a period varying from 15 to 60 minutes at a maximum temperature which will not impair the metal parts in any way such as by warping, or by destroying tempered qualities from a previous heat treatment, or by oxidation or other discoloring of the metal surfaces. It has been found that the above described bonding heat treatment can be very satisfactorily performed at temperatures varying from 1200° F. down to 900° F. Of course the higher temperature requires less time for the Cu to diffuse through the tin layer 32 and convert same into a high melting point bronze, and hence where a temperature of around 1200° F. is not harmful to the metal parts of the assembly it is preferred since a saving in time and hence cost is effected thereby. It is to be noted however that when circumstances so require the tin layer 32 can be converted into higher melting point bronze at 900° F. or even lower provided the heat is maintained a sufficiently long time. The thinness of the tin layer 32 not only greatly reduces the time required for the heat treatment, as above described, but also in the final article results in a very thin bronze layer 43 of high copper content which impedes the conduction of heat from cylinder 30 to the cooling fins 40 only a very slight amount. Hence in the final article so far as heat conduction is concerned the fins 40 are substantially integral with the Cu layer 31 which is plated directly upon the ferrous cylinder 30 with a substantially perfect physical and thermal bond.

If desired, the tin coating 32 may be applied to the contacting surface of the Cu bases 42 instead of to the Cu layer 31, the other steps remaining as above described. In such case it is obvious that the final result will be substantially the same. Or a very thin tin coating may be applied to the contacting surfaces of both the Cu layer 31 and the Cu bases 42, which may be desired in some cases to insure against oxidation of the Cu surfaces if they are left to stand a considerable period of time in the commercial process.

While the form of embodiment of the present invention as herein disclosed, constitutes a preferred form, it is to be understood that other forms might be adopted, all coming within the scope of the claims which follow.

What is claimed is as follows:

1. The process of forming and bonding copper fins to a ferrous metal cylinder, comprising: pleating a thin sheet of Cu so as to form a plurality of spaced fin loops, connected by connecting bases, copper plating the exterior surface of said cylinder, wrapping said pleated fins around said cylinder with an interposed relatively thin layer of tin between said fins and cylinder, then heating the assembly to such a temperature as will cause substantially all the tin layer to alloy with the Cu on both sides thereof.

2. The process of forming and bonding copper fins to a ferrous metal cylinder, comprising: pleating a thin sheet of Cu so as to form a plurality of spaced fin loops, connected by connecting bases, copper plating the exterior surface of said cylinder, applying a relatively thin layer of tin upon said copper coated surface, wrapping and pressing said pleated fins upon said coated cylinder and tin layer, then heating the assembly to a temperature not above 1200° F. for such period of time as will cause the tin layer to substantially all alloy with the Cu metal on both sides thereof.

3. The process of forming and bonding copper fins to a ferrous metal cylinder, comprising: pleating a thin sheet of Cu so as to form a plurality of spaced fin loops, connected by connecting bases, providing a finely serrated or roughened bonding surface on the ferrous cylinder, copper plating said roughened surface, tin coating over the Cu leaving a very thin coating of tin on the high areas of said roughened surface, wrapping and pressing said pleated fins upon said coated cylinder, then heating to a temperature below the melting point of copper until the tin coating on said high areas is substantially all alloyed with the Cu on both sides thereof.

4. The process of forming and bonding copper fins to a ferrous metal cylinder, comprising: pleating a thin sheet of Cu so as to form a plurality of spaced fin loops, connected by connecting bases, providing a finely serrated or roughened bonding surface on the ferrous cylinder, copper plating said roughened surface, tin coating over the Cu leaving a very thin coating of tin on the high areas of said roughened surface, wrapping and pressing said pleated fins upon said coated cylinder, then heating to a temperature below 1300° F. until the tin coating on said high areas slowly but substantially completely diffuses into the Cu on both sides thereof.

5. The process of forming and bonding copper fins to a ferrous metal cylinder, comprising: pleating a thin sheet of Cu so as to form a plurality of spaced fin loops, connected by connecting bases, providing a finely serrated or roughened bonding surface on the ferrous cylinder, copper plating said roughened surface, tin coating over the Cu leaving a very thin coating of tin on the high areas of said roughened surface, wrapping and pressing said pleated fins upon said coated cylinder, then heating to a temperature of around 1100° F. until the tin coating on said high areas slowly but substantially completely diffuses into the Cu on both sides thereof.

6. The process of forming and bonding copper fins to a ferrous metal cylinder, comprising: pleating a thin sheet of Cu so as to form a plurality of spaced fin loops, connected by connecting bases, providing a finely serrated or roughened bonding surface on the ferrous cylinder, copper plating said roughened surface, tin coating over the Cu leaving a very thin coating of tin on the high areas of said roughened surface, wrapping and pressing said pleated fins upon said coated cylinder, then heating to a moderate temperature far below the melting point of copper until the tin coating on said high areas alloys with the Cu on both sides thereof.

In testimony whereof I hereto affix my signature.

ROLAND P. KOEHRING.